US011160258B1

(12) United States Patent
Chiles et al.

(10) Patent No.: US 11,160,258 B1
(45) Date of Patent: Nov. 2, 2021

(54) POLLINATOR NURSERY APPARATUS AND METHODS

(71) Applicants: Ames B. R. Chiles, Bois D'Arc, MO (US); Daniel T. Chiles, Bois D'Arc, MO (US)

(72) Inventors: Ames B. R. Chiles, Bois D'Arc, MO (US); Daniel T. Chiles, Bois D'Arc, MO (US)

( * ) Notice: Subject to any disclaimer, the term of this patent is extended or adjusted under 35 U.S.C. 154(b) by 0 days.

(21) Appl. No.: 16/715,495

(22) Filed: Dec. 16, 2019

Related U.S. Application Data

(60) Provisional application No. 62/779,556, filed on Dec. 14, 2018.

(51) Int. Cl.
*A01K 47/06* (2006.01)

(52) U.S. Cl.
CPC .................................. *A01K 47/06* (2013.01)

(58) Field of Classification Search
CPC ............................... A01K 47/00; A01K 47/06
USPC ..................... 449/4, 29, 30, 32–34
See application file for complete search history.

(56) References Cited

U.S. PATENT DOCUMENTS

| | | | | |
|---|---|---|---|---|
| 120,698 | A | * | 11/1871 | Burr ........................ A01K 47/00 449/46 |
| 314,972 | A | * | 3/1885 | Mitchell ................. A01K 47/00 449/26 |
| 3,191,199 | A | * | 6/1965 | Barnes, Jr. ............. A01K 47/00 449/4 |
| 3,267,497 | A | * | 8/1966 | Dority .................... A01K 49/00 449/4 |
| 4,257,134 | A | | 3/1981 | Niebur ................. A01K 67/033 |
| 4,319,371 | A | | 3/1982 | Wiederrich .......... A01K 67/033 |
| 4,365,372 | A | | 12/1982 | Norman ............... A01K 67/033 |
| 4,491,994 | A | | 1/1985 | Youssef ................. A01K 47/00 |
| 4,628,558 | A | | 12/1986 | Pederson ............. A01K 67/033 |
| 4,716,609 | A | | 1/1988 | Norman ............... A01K 67/033 |
| 4,718,134 | A | * | 1/1988 | Ashby ..................... A01K 57/00 449/28 |
| 4,765,007 | A | | 8/1988 | McCarthy ............ A01K 67/033 |
| 4,787,108 | A | | 11/1988 | Norman ................. A01K 47/00 |
| 5,211,597 | A | * | 5/1993 | Scott ....................... A01K 47/00 449/27 |
| 5,403,226 | A | | 4/1995 | Trafford ................. A01K 47/02 |

(Continued)

FOREIGN PATENT DOCUMENTS

DE 202018000003 U1 * 2/2018 ............ A01K 47/00
DE 202018000431 U1 * 5/2018 ............ A01K 47/06

OTHER PUBLICATIONS

English-language translation of DE 202018000003 U1 (Year: 2018).*
English-language translation of DE 202018000431 U1 (Year: 2018).*

*Primary Examiner* — Lisa L Tsang
(74) *Attorney, Agent, or Firm* — Jonathan A. Bay

(57) ABSTRACT

A nursery habitat for flying pollinators has an axially-elongated tubular case and a multiplicity of elongated tubes. The case extends between a first end and a second end and defines an axially-elongated hollow tunnel, wherein at least one of the first end or the second end is provided with an opening. The tubes extending between a front end and a back end wherein at least the front end is open. The multiplicity of elongated tubes is disposed in closely-spaced packing inside the tunnel of the case with the open front ends of the tubes being accessible to flying pollinators through the opening in the case.

6 Claims, 20 Drawing Sheets

(56) References Cited

U.S. PATENT DOCUMENTS

| | | | | |
|---|---|---|---|---|
| 5,509,846 A | * | 4/1996 | Kueneman | A01K 47/00 449/11 |
| 5,618,220 A | * | 4/1997 | Mills | A01K 47/00 449/4 |
| 6,364,738 B1 | | 4/2002 | Kendell et al. | A01K 47/00 |
| D473,351 S | * | 4/2003 | Critchley | D30/111 |
| 7,086,924 B2 | | 8/2006 | Mills | A01K 47/00 |
| 7,927,178 B2 | | 4/2011 | Alazemi | A01K 47/00 |
| 7,959,486 B1 | | 6/2011 | Lee | A01K 47/06 |
| D652,997 S | | 1/2012 | Collins | D30/108 |
| D666,780 S | | 9/2012 | Novich et al. | D30/108 |
| 8,465,340 B1 | | 6/2013 | Allan | A01K 67/003 |
| 8,517,793 B2 | | 8/2013 | Weeden | A01K 47/06 |
| 8,602,837 B1 | | 12/2013 | Allan | A01K 47/00 |
| 9,801,358 B1 | | 10/2017 | Allan | A01K 47/06 |
| 2007/0218804 A1 | * | 9/2007 | Allan | A01K 49/00 449/4 |
| 2018/0255748 A1 | * | 9/2018 | Vanderhoff | A01K 49/00 |

\* cited by examiner

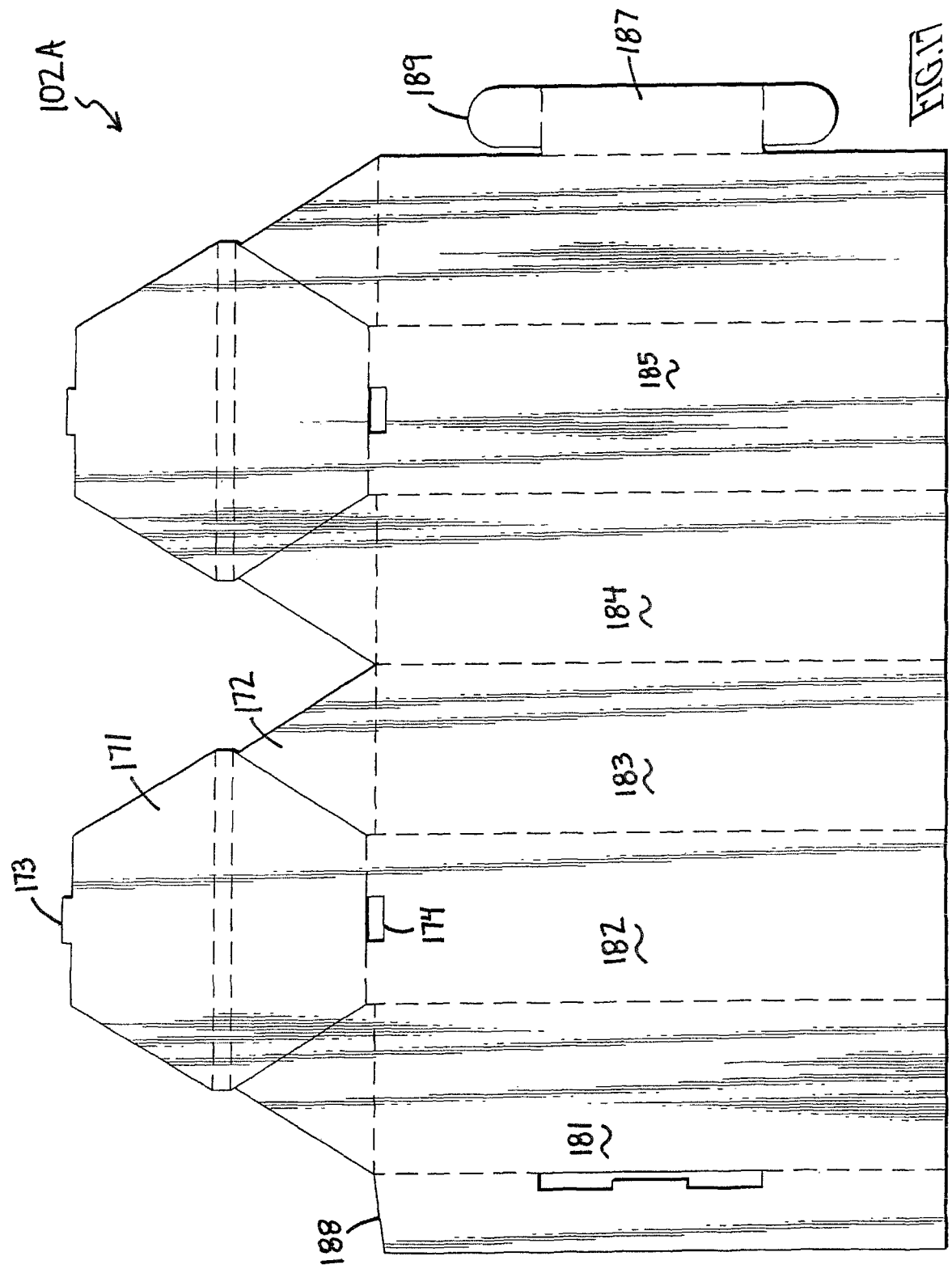

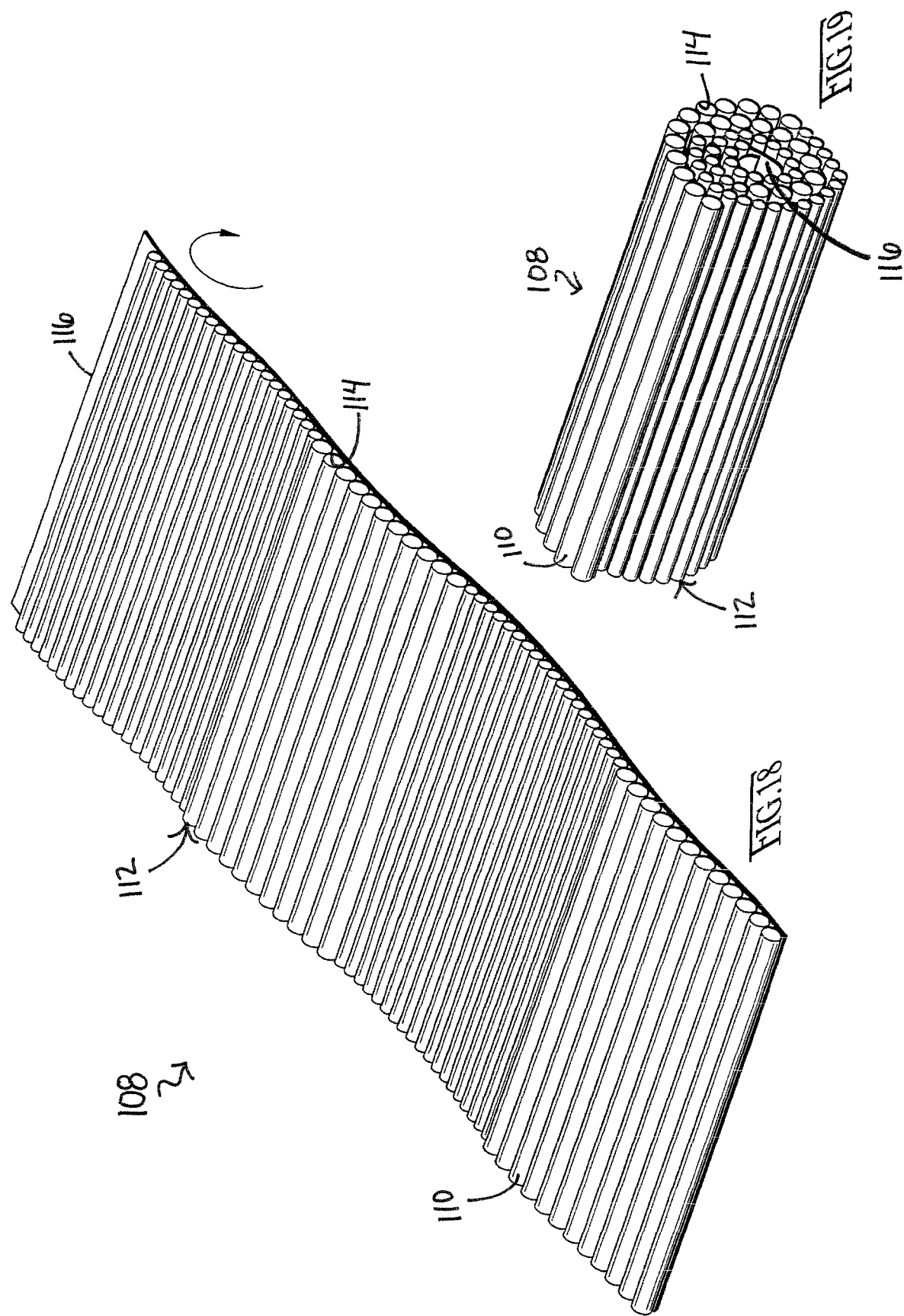

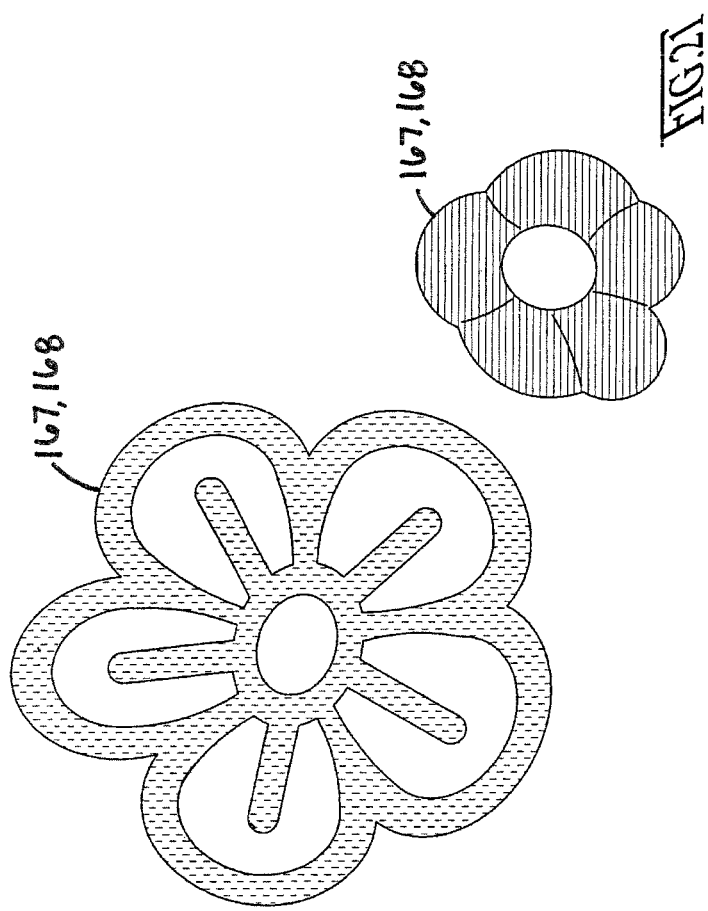

POLLINATOR NURSERY APPARATUS AND METHODS

CROSS-REFERENCE TO PROVISIONAL APPLICATION(S)

This application claims the benefit of U.S. Provisional Application No. 62/779,556, filed Dec. 14, 2019, the disclosure of which is incorporate herein by this reference thereto.

BACKGROUND AND SUMMARY OF THE INVENTION

The invention relates to pollinator culture (eg., bee culture) and, more particularly, to nursery habitats for solitary pollinators:—predominantly, solitary (eg, non-honey producing) bees as well as wasps and other insects (eg., butterflies, beetles and so on).

"You're Worrying About the Wrong Bees" is the title of an online article reciting:

Honey bees will be fine. They are a globally distributed, domesticated animal. *Apis mellifera* will not go extinct, and the species is not remotely threatened with extinction.

The bees you should be concerned about are the 3,999 other bee species living in North America, most of which are solitary, stingless, ground-nesting bees you've never heard of . . . .

By Gwen Pearson, dated Apr. 29, 2015, and accessed online on Dec. 13, 2019, at https://www.wired.com/2015/04/youre-worrying-wrong-bees/.

The inventors hereof are a father and daughter team. They are hobbyists, and avid ones at that. The following information is derived from their literature study and personal experience, and is believed to be fairly conventional information.

The visitors to their nursery habitats in accordance with their invention(s) are predominantly leaf cutter bees and mason bees. In the bee and wasp world, the following groups of pollinators are not expected to use the nursery habitats in accordance with their invention because of those pollinators' own hive-forming or nest-forming proclivities. These would include honey bees (with colonies of 20,000 to 80,000 bees), bumble bees (with nests of ~400 bees), burrowing as well as paper-nest building hornets and so on. There is a group of hive-forming, honey-producing bees formally referred to as "stingless bees," but these are not encountered at the inventors' relatively northern latitude.

What's left are called "solitary bees," or solitary pollinators here. Again, leaf cutter and mason bees are what have been most commonly seen. Carpenter bees and other pollinators are welcome but evidently are not as interested.

The term "solitary" here signifies being "solitary" only as much so as, for example, the birds purple martins. Every female solitary bee is fertile and has her own nest, but solitary bees will nest in clusters in fairly dense proximity to each other. The nursery habitats in accordance with the invention are formed of dozens of horizontal straws (or tubes) fairly tightly packed close together to mimic the cell structure of a honey comb.

Each female bee will take possession of one tube at a time. She lays a series of eggs in the tube axially-spaced apart. She begins at the front of the tube laying male eggs and proceeds to the back of the tube finishing up with female eggs, laying 7 to 10 or so eggs total, given sufficient length of tube. She will then come back and stockpile each egg with a food cache. She will then also build a cell enclosing each egg and food cache. Leaf cutter bees are known for cutting leafs or petals to build their nests. Mason bees are known for using mud or other "masonry" products to build theirs.

Thus begins a new generation. The time of year this happens is spring, perhaps continuing into early summer. Leaf cutter bees might produce 2-3 generations over a summer. Mason bees most familiar to the inventors have an annual life cycle and are believed to produce only 1 generation over a summer.

Female mason bees are active only for a couple of weeks or so in the Spring. Their nest-building activity might require one hundred trips (more or less) back and forth to the tube for stockpiling the food caches and building the cells. The tube entrance is ultimately plugged. After that, the mason bee eggs are on their own. The adult mason bees cease being active in May or so.

In not too long of time (days, perhaps weeks), larvae hatch from the eggs of the mason bees. In a matter of a number of further weeks, the larvae will have consumed their food cache and begin spinning a cocoon. It is believed that they overwinter as a pupa in a cocoon. Springtime and warming temperatures see the emergence of the adults, and the cycle repeats.

For the life cycle to complete itself, the larva has to survive, the food cache cannot be raided, and then the pupa has to survive. But there are many threats. There are predators like woodpeckers and parasitic wasps. There are biologic threats like mites, parasites and mold. There are weather threats, like wind or vibration breaching the structural integrity of the nests. And then there are just other pests like squirrels gnawing at or otherwise damaging the structure for no real reason in the connection with food collection.

It is an object of the invention to provide nursery habitats that lend to being used in ways which improves the chances of successful completion of the life cycle.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 7 is a layout view of the pod case flat, prior to folding and assembly, as produced from flat corrugated fiberboard stock material, wherein FIG. 7 shows cut lines, slit lines, fold lines, perforation lines as well as punched apertures (eg., round holes here);

FIG. 17 is a layout view of the pod case flat, prior to folding and assembly, as produced from flat corrugated fiberboard stock material, wherein FIG. 17 shows cut lines, slit lines, fold lines, as well as punched apertures (eg., rectangular cutouts here);

FIG. 18 is a perspective view of a the pod core comprising in a flat configuration and prior to rolling up in a coil, comprising a multiplicity of elongated small-diameter paper tubes (eg., straws) aligned side-by-side in the manner of stakes in a palisade stakewall, and adhered to a web composed of for example and without limitation corrugated fiberboard;

FIG. 19 is a perspective view comparable to FIG. 18 except showing the core rolled up into a loose cylindrical coil;

FIG. 21 is lined for color and shows that the floral patterns gracing the pollinator nursery habitats of FIGS. 1, 8 and 20 are chosen not only for simulating the outline of blooming flowers but also colored (eg., purple-violet for the flower on the left, blue for the flower on the right) to further enhance the attractant qualities of and/or navigation-cues offered by the patterns.

DETAILED DESCRIPTION OF THE PREFERRED EMBODIMENTS

Figure 1:
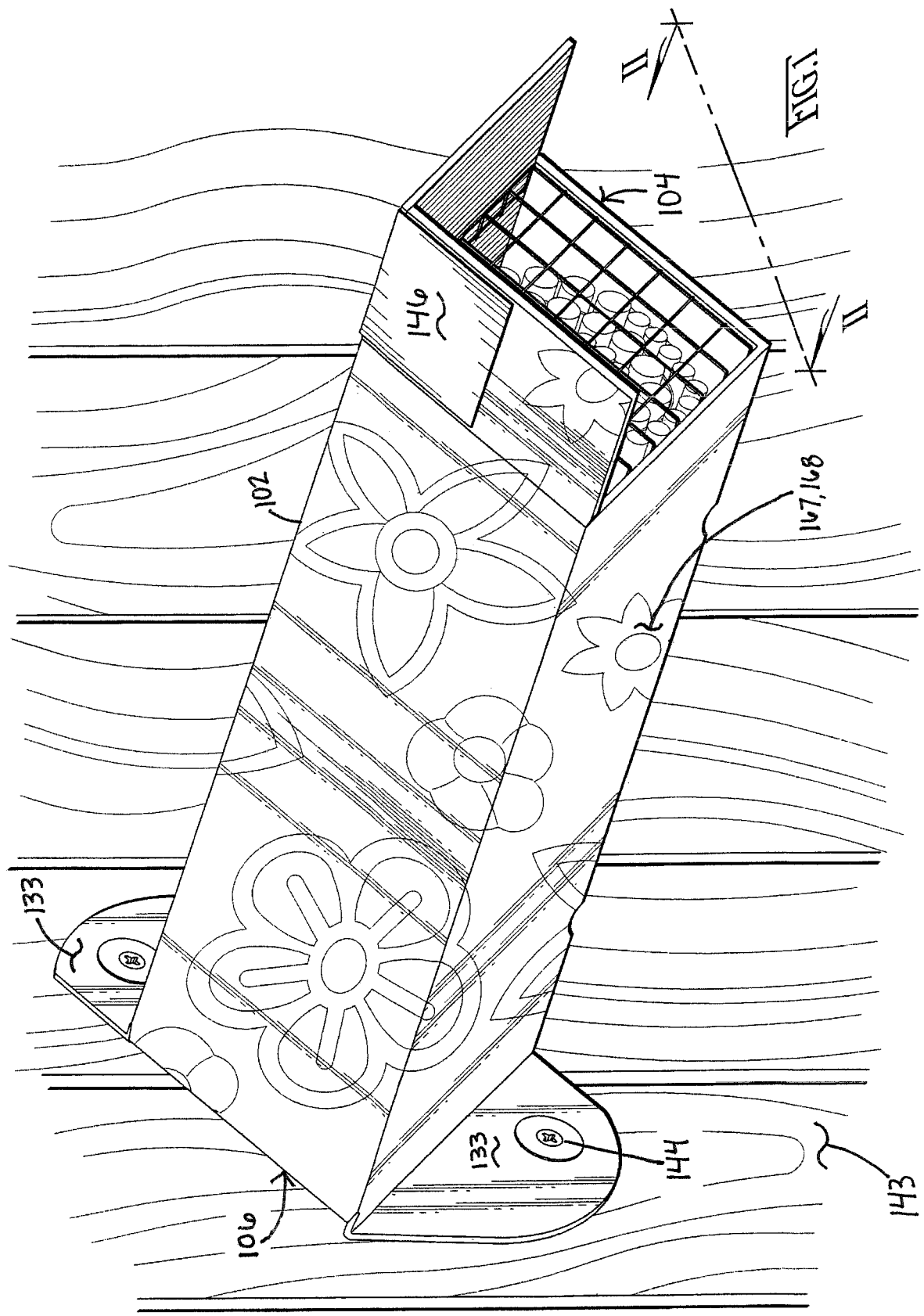
FIG. 1 is a perspective view of a pollinator nursery habitat in accordance with the invention.
Figure 2:
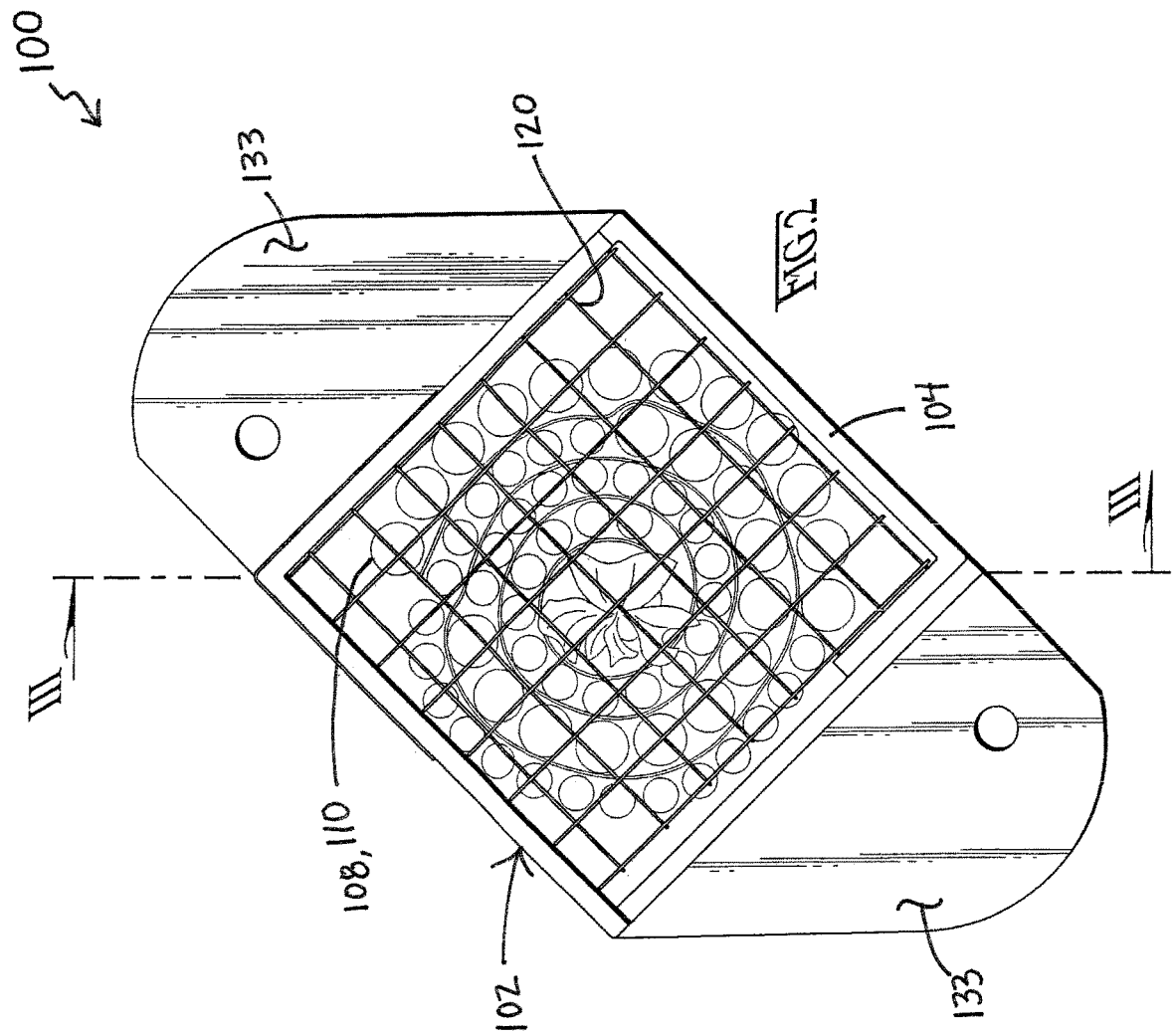
FIG. 2 is an end elevation view taken in the direction of arrows II-II in FIG. 1.
Figure 3:
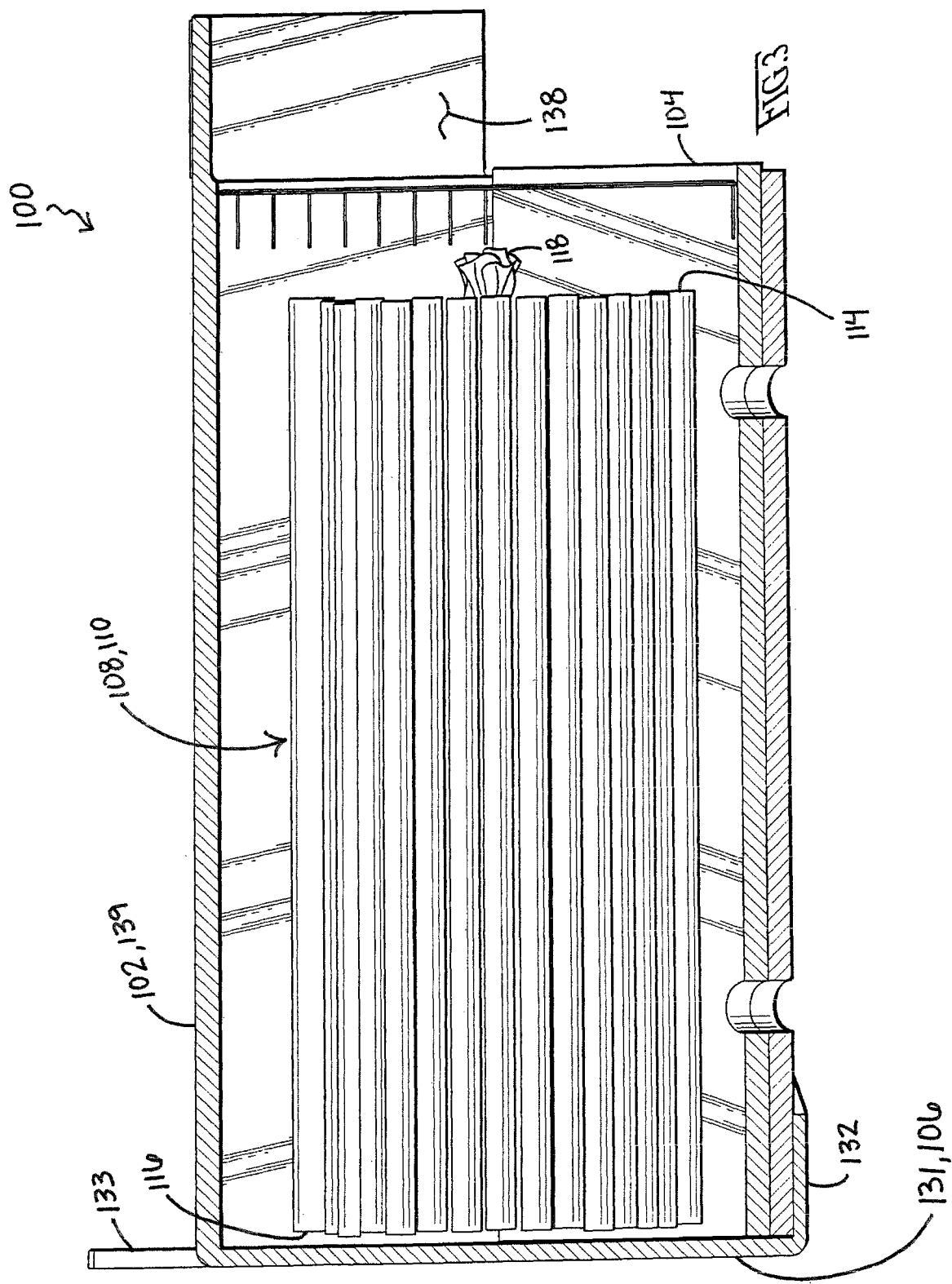
FIG. 3 is an axial elevation view, partly in section, taken along line III-III in FIG. 2.

FIGS. 1 through 7 show a pollinator nursery habitat 100 in accordance with the invention. The pollinator nursery habitat 100 is a single unit or pod having an exterior case 102 of corrugated fiber board (also known by other names including without limitation cardboard). The case 102 is formed into an elongated tunnel that extends between an open end 104 and a closed end 106. This tunnel (receives and) contains a core 108 comprising a multiplicity of elongated small-diameter paper tubes 110 (eg., straws) packed fairly close together. The tubes 110 are open at both ends 112 and 114 but since the back ends 112 of the tubes 110 back up against the closed end 106 of the case 102, the tubes 110 are essentially closed-ended at their back ends 112 proximate the closed end 106 of the case 102. Correspondingly, the tubes 110 are essentially open-ended at their front ends 114 because their front ends 114 face the open end 104 of the case 102.

The tubes 110 serve as the nest sites for the pollinators. As mentioned previously, leaf cutter and mason bee pollinators will lay seven to ten or so eggs in a tube 110, axially spaced apart, if the tubes 110 are sufficiently long. It is believed that the tubes 110 should be no less than six inches (~fifteen cm) long and further that, there are no diminishing returns if the tubes 110 are longer, even much longer. The inventors hereof prefer about eight inches (~twenty cm) long.

The tubes 110 are provided in a variety of different diameters. The inventors hereof prefer an array of four different diameters, namely, nominally six, eight, ten and twelve millimeter diameters respectfully. A sample core 108 might comprise for example and without limitation:—
- twenty of the six millimeter tubes;
- fifteen of the eight millimeter tubes;
- twelve of the ten millimeter tubes; and
- ten of the twelve millimeter tubes.

FIGS. 18 and 19 show better the production of a sample core 108. The core 108 is originally produced in a flat configuration on an outstretched web 116. The web 116 preferably produced from corrugated fiber board stock material, as is the case 102. However, the case 102 is preferably produced of the double-sided liner board variety of corrugated fiber board while the web 116 is preferably produced of single-sided liner board corrugated fiber board, The double-sided liner board variety of corrugated fiber board has inherent insulating properties, because of the trapped air, and which inherent insulating properties should help keep the bees safer during inclement weather.

FIG. 18 shows the multiplicity of tubes 110 laid out on the web 116 preferably on the liner board side (eg., corrugated side is down) and side-by-side in the manner of stakes in a palisade stakewall. The paper tubes 110 (straws) can be installed in a loose fashion. But preferably the tubes 110 are lightly adhered to the web 116 to keep their position during the rolling up of the web 116 and tubes 110 into the generally cylindrical coil core 108 shown in FIG. 19. The open front ends 114 of the tubes 110 are closely packed. But given that the tubes 110 are provided in a variety of diameters, and further given that the core 108 is produced in a coil, there is no exact packing pattern of the tubes 110, such as a perfect (or nearly so) face-centered pattern or the like.

Nevertheless, the tubes 110 are relatively densely packed together, even if not perfectly so in a face-centered arrangement. Experience shows that different bee species will use different tubes 110 in the same core 108. Evidently the different bee species are not too concerned about neighbors.

Plus, as the season goes on, later visitors possibly do not know who their neighbors are in earlier-plugged tubes 110. While the inventors can at least determine a little bit of that information by plug material (eg., leaf material for leaf cutter bees vs. "masonry" material for mason bees), it is not known what the bees actually know, or care about.

The light adhesive preferably is chosen with the same last-result in mind for the case 102 as for the tubes 110. Which is, that the pollinator nursery habitat 100 in accordance with the invention is used for one season and then disposed in the manner of being added to a compost pile to compost away.

The center of the core 108 is adorned with an artificial flower 118. Tissue paper is preferred, and colors closer to the ultra-violet fringe of the visible spectrum (or just inside in the near ultra-violet range) are further preferred. Namely, this would be various hues of purple, violet, blues, pinks and so on. These artificial flowers 118 are believed to serve as visual attractants and perhaps also serve as navigational cues for the mother bee to find over and over again her tube 110 while building her nest.

The open end 104 of the case 102 is preferably provided with a wire grill 120 (or less preferably so, a plastic screen) barrier. The grill 120 probably won't save the eggs in any tube 110 closest to the open end 104 of the case 102 from a determined woodpecker or the like. But the grill 120 should prevent a woodpecker from going to far down the length of the tube 110 and thus help protect the eggs further from the open end 104. It is noted that the male eggs are closest to the open end 104 of the case 102 (open front ends 114 of the tubes 110) and the female eggs furthest. Hence the population overall is not as hurt by some predation of the male eggs in contrast to the relatively higher value female eggs.

Figure 7:
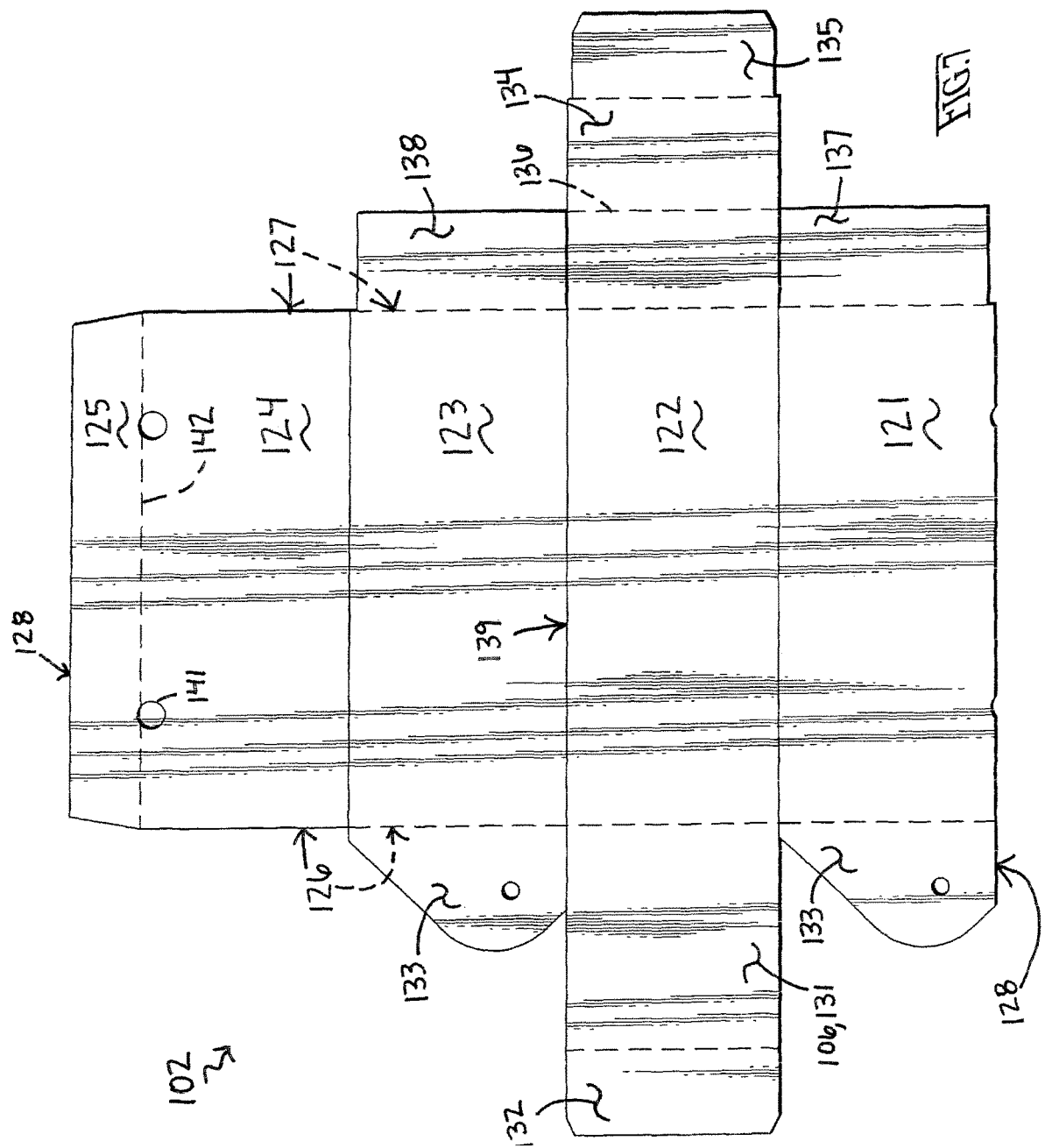

To turn to FIG. 7, it is a layout view of the case 102 flat, prior to folding and assembly, as produced from flat corrugated fiberboard stock material. FIG. 7 shows cut lines, slit lines, fold lines, perforation lines as well as punched apertures (eg., which are round holes here).

The layout comprises four inboard panels 121-124 which will form the four exterior sidewalls for the case 102. From top to bottom, there is a first inboard panel 121, second inboard panel 122, third inboard panel 123 and fourth inboard panel 124. There is also a fifth inboard panel 125 on top of the fourth inboard panel 124.

There is one common edge 126 along the left side (left in FIG. 7) of all five inboard panels 121-125 that will form the periphery of the closed end 106 of the case 102. On the opposite side of the inboard panels 121-125, there is another common edge 127 that will form the periphery of the open end 104 of the case 102.

The respective portions of the closed-end edge 126 for the first, second and third inboard panels 121-123 are simultaneously fold lines. Likewise, the respective portions of the open-end edge 127 for the first, second and third inboard panels 121-123 are also simultaneously fold lines.

The first inboard panel 121 and the fifth inboard panel have lateral free edges 128. All other meeting lines between the panels 121-125 are fold lines.

The fifth inboard panel 125 serves as an overlap strip which overlaps either on the inside (or outside) margin of the free edge 128 of the first inboard panel 121. This can be seen at the bottom in FIG. 3 by the depiction of a double ply arrangement of corrugated fiber board, one ply being the first inboard panel 121 and the other ply being the fifth inboard panel 125. The fifth inboard panel 125 will be adjoined to the inside (or outside) margin of the free edge 128 of the first inboard panel 121 (adhesively or by mechanical fastening) so that the case 102 holds its rectangular tunnel shape.

Returning to FIG. 7, various flaps extend from both the closed-end edge 126 and open-end edge 127.

Starting with the closed-end edge 126, it has one flap 131 extending from the second inboard panel 122 that serves as the closure for the closed end 106, and this closure flap 131 further has an overlap strip 132 for overlapping onto the margin of the portion of the closed-end edge 126 of the fourth inboard panel 124. The overlap strip 132 for the closure flap 131 will be adjoined to the margin of the closed-end edge 26 the fourth inboard panel 124 adhesively or by mechanical fastening and the like.

The two permanently fastened overlap strips 125 and 132 mentioned so far hold the case 102 in a rigid tunnel shape with a square cross-section.

Whereas FIGS. 1 through 7 show a case 102 configured in a rectangular box shape having a square cross-section, for comparison, FIGS. 8 through 20 show cases 102A configured in a box shape having a hexagonal cross-section. Cylindrical and/or ovoid cross-section shapes are not excluded. But with regard to polygonal cross-section shapes, any polygonal shape can be chosen. It's just recognized that, a box shape with an equilateral triangular cross-section (not shown) serves better for providing a steeply peaked roof, but has more void space in the three vertices surrounding the generally cylindrical core 108. Whereas a box shape having a hexagonal cross-section (eg., case 102A) has an interior which more closely conforms to the generally cylindrical core 108, but more poorly presents a rain-shedding peak for a roof as that any peak would be shallower.

Hence the FIGS. 1-7 shape showing a case 102 configured in a rectangular box shape with a square cross-section is preferred for stand-alone exposure to rain, with one corner oriented up to serve as a rain-shedding peak for a roof. In contrast, the FIGS. 8-20 shapes showing cases 102A configured in a box shape having a hexagonal cross-section are chosen for deposit in the multi-unit shelter 150 therefor, where the shelter 150 provides a roof 152 with a peak.

Returning back to FIG. 7, one flap 133 and another flap 133 extending from the closed-end edge of the first inboard panel 121 and third inboard panel 123, respectively, serve as mounting flanges 133, as shown in FIG. 1.

Figure 6:
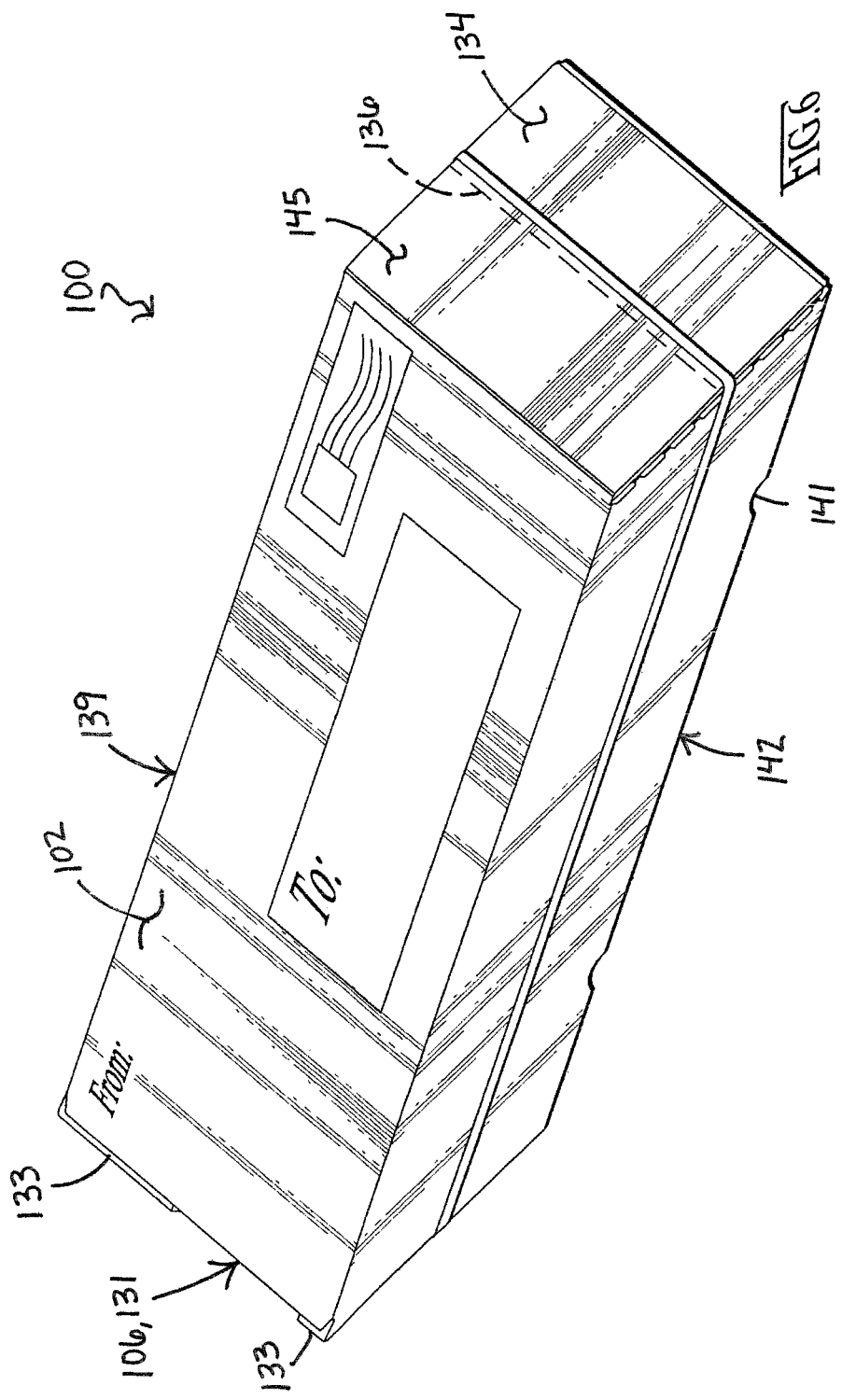
FIG. 6 is a perspective view comparable to FIG. 5 and showing the pollinator nursery habitat in accordance with the invention converted into an article for shipment through the U.S. Mail or other courier/carrier service.

Attention can now be given to the flaps extending from the portions of the open-end edge 127 of the first, second and third inboard panels 121, 122 and 123. The flap 134 extending from the second inboard panel 122 serves as a temporary closure for the time being that the case 102 serves a shipping container as shown in FIG. 6. So one manner of use of the pollinator nursery habitat 100 in accordance with the invention is that it is purchased (or obtained) by remote users who receive it in the U.S. Mail or by other courier/carrier service. After receipt, the user completes some light assembly to render the pollinator nursery habitat 100 into a use configuration as shown by FIG. 1.

Hence the temporary closure flap 134 extending from the open-end edge 127 of the second inboard panel 122 terminates in an overlap strip 135 for temporary fastening to the a margin of the portion of the open-end edge 127 of the fourth inboard panel 124. The folding and fastening of the overlap strip 135 can be seen in comparing FIG. 5 to FIG. 6.

The temporary closure flap 134 furthermore has a perforated score line 136 running across it intermediate its overlap strip 135 and its fold line with the second inboard panel 122, which fold line is the second inboard panel 122's portion of the open-end edge 127. The purpose of this perforated score line 136 will be described below, just in about a few paragraphs from here.

The portions of the open-end edge 127 of the first and third inboard panels 121 and 123 further have abbreviated flaps 137 and 138, respectively. These flaps 137 and 138 might or might not overlap with each other when the case 102 is folded up in the shipping configuration of FIG. 6. It is preferred that the flaps 137 and 138 do not actually overlap, but just come close to touching.

Figure 4:
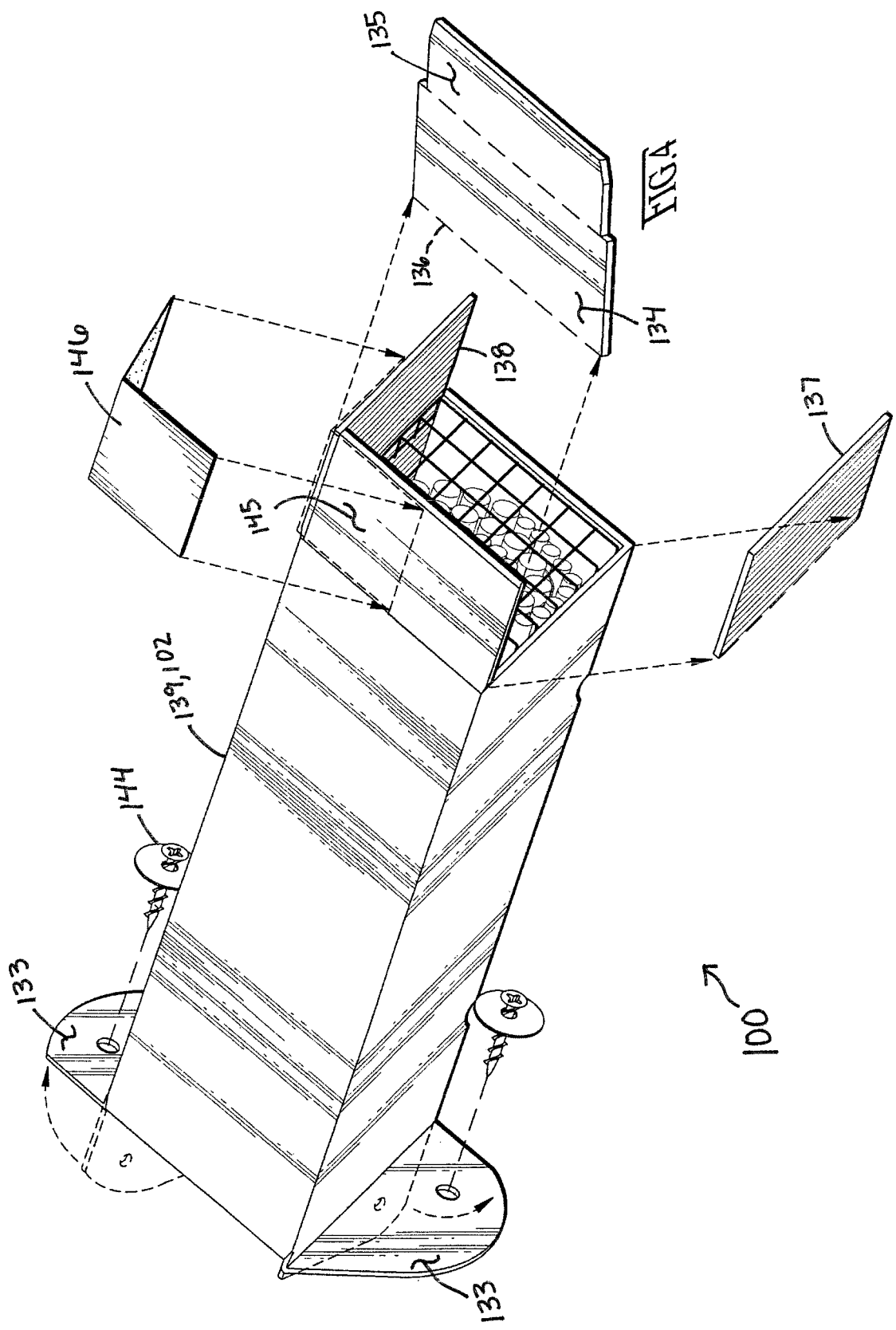
FIG. 4 is a reduced scale perspective view comparable to FIG. 1 but showing better the mounting and eave-forming provisions thereof.
Figure 5:
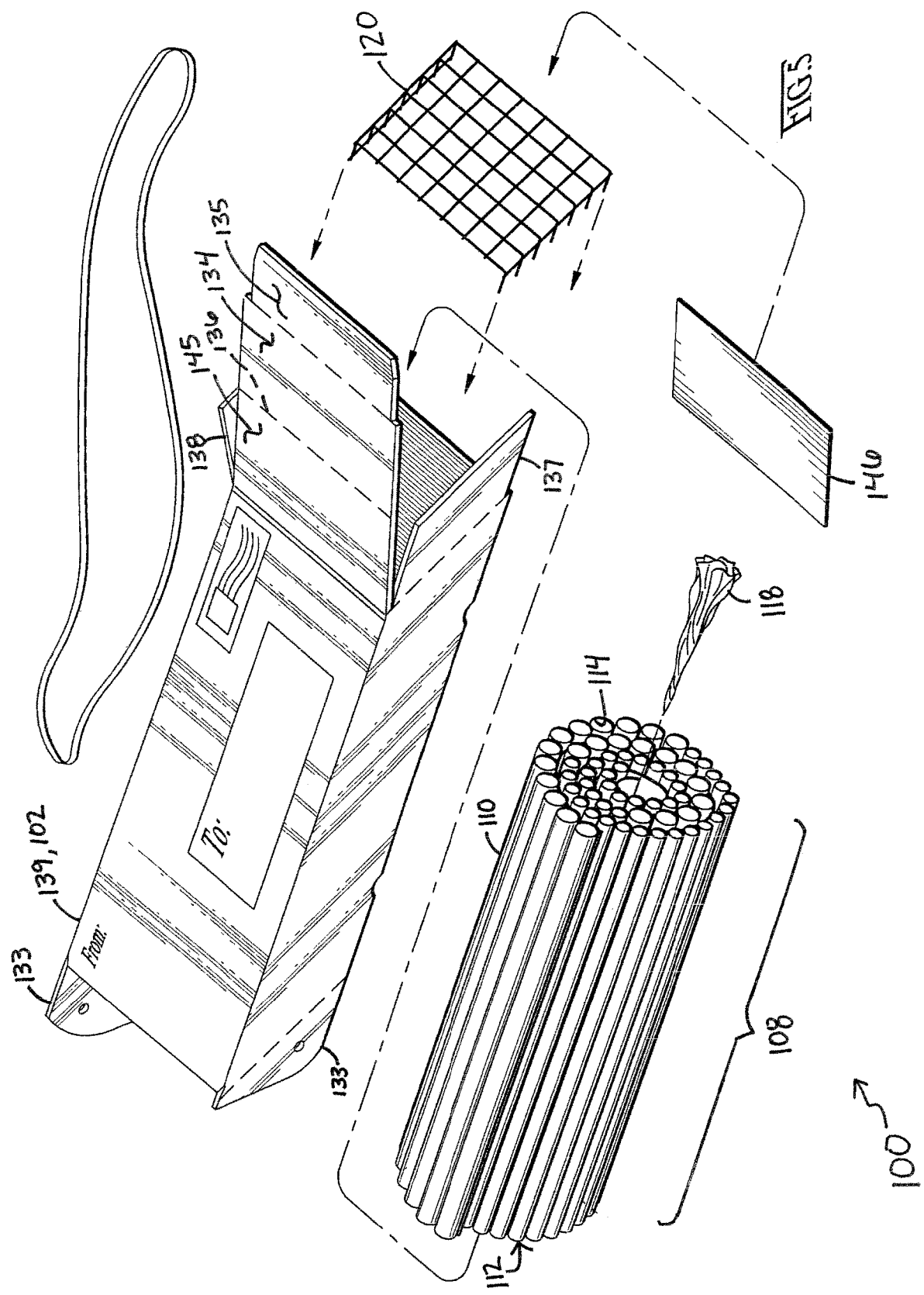
FIG. 5 is an exploded view of FIG. 6 but showing better the transformation thereof into a shipping configuration therefor.

The following discussion compares FIG. 7 to FIG. 4, so it is probably helpful to study both illustrations side-by-side. The second and third inboard panels 122 and 123 are intended to serve as the roof of the case 102 and the fold line 139 between the second and third inboard panels 122 and 123 is intended to serve as the peak.

The holes 141 along the fold line 142 between the fourth and fifth inboard panels 124 and 125 serve as drain holes. The mounting flaps 133 extending from the portions of the closed-end edge 126 of the first and third inboard panels 121 and 123 serve as flanges for mounting the pollinator nursery habitat 100 to a wall 143 (eg., any suitable vertical support surface). These flaps or mounting flanges 133 are pre-formed with holes for receiving mechanical fasteners (eg., screws 144). The flap 137 extending from the open-end edge 127 of the first inboard panel 121 is used only during the shipping configuration of the case 102. The end-user tears that flap 137 off and discards it, as shown in FIG. 4 (and preferably again by way of compost pile). The user then tears the temporary closure flap 134 in half at the perforated score line 136, which is the purpose of the perforated score line 136. FIG. 4 shows this in progress. Hence this leaves a stub 145 of the former flap 134 extending from the open-end edge 127 of the second inboard panel 122.

This stub 145 of the former temporary closure flap 134 and the flap 138 extending from the open-end edge 127 of the third inboard panel 123 form a peaked eave 145,138 extending out for some protection of the open end 104 of the case 102 from rain. The user is further provided with a crown 146 to cover the seam between the stub 145 of the second inboard panel 121 and flap 138 of third inboard panel 123. This crown 146 can be a strip of tape which further serves to seal the seam between the stub 145 and flap 138.

FIGS. 8 through 20 show an alternate embodiment of a pollinator nursery habitat 100A in accordance with the invention, being in combination with a multi-unit shelter 150 sheltering a plurality of pollinator nursery habitat units or pods 100A.

The shelter 150 is configured like a miniature shed that a gardener might have outdoors to store gardening tools, implements and supplies. The shed is preferably constructed of the double-sided liner board variety of corrugated fiber board. The roof 152 is produced from a single piece of stock material and the rest of the 154 structure is produced from another single piece.

Figure 12:
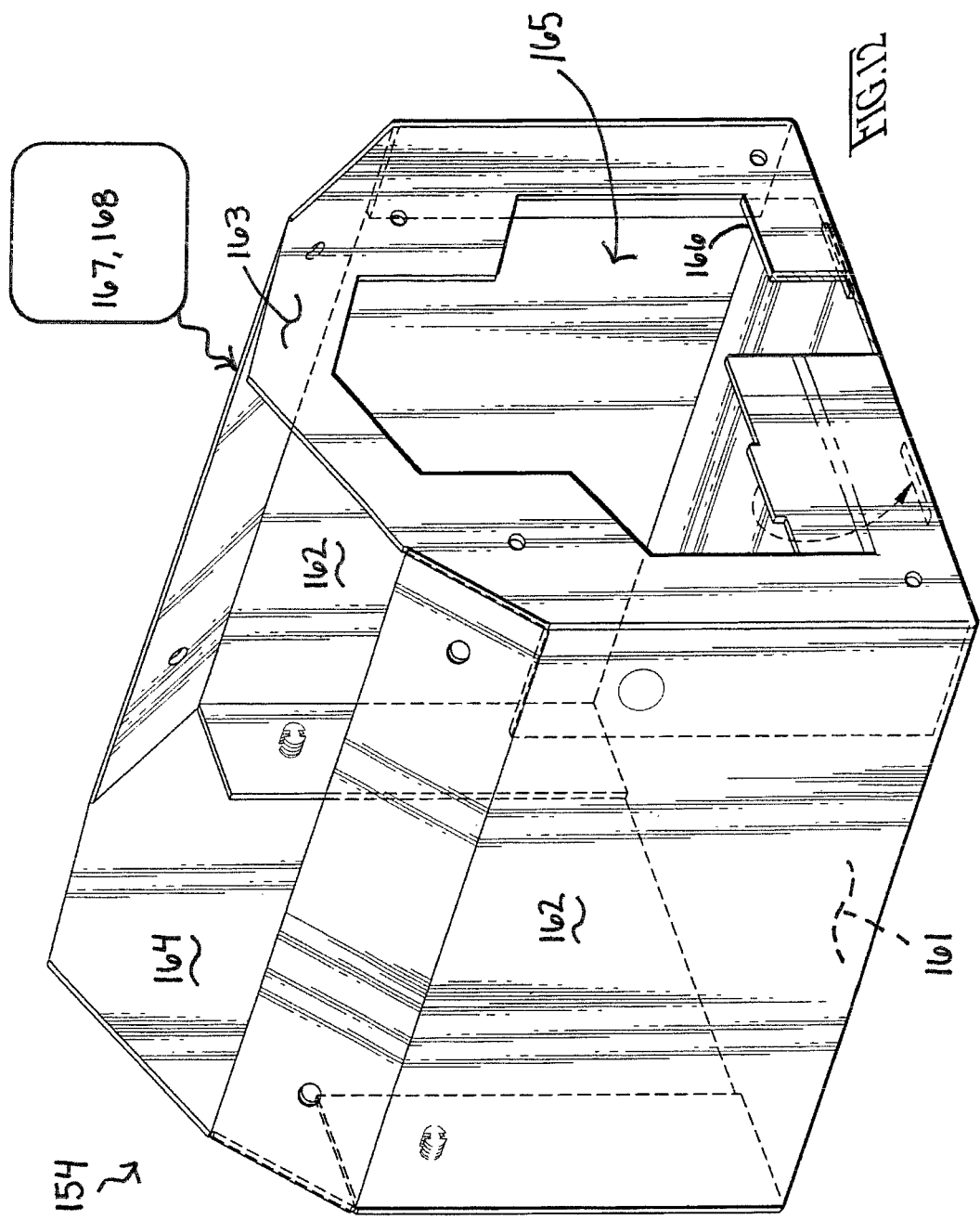
FIG. 12 is a perspective view comparable to FIG. 8 except showing the roof, the interior pods and front grill (or screen) removed from view and before coating the sidewalls with a floral attractant pattern, as well as an optional mineral coating to improve weather resistance but not ruin the possibility of being compostable in a compost pile.
Figure 13:
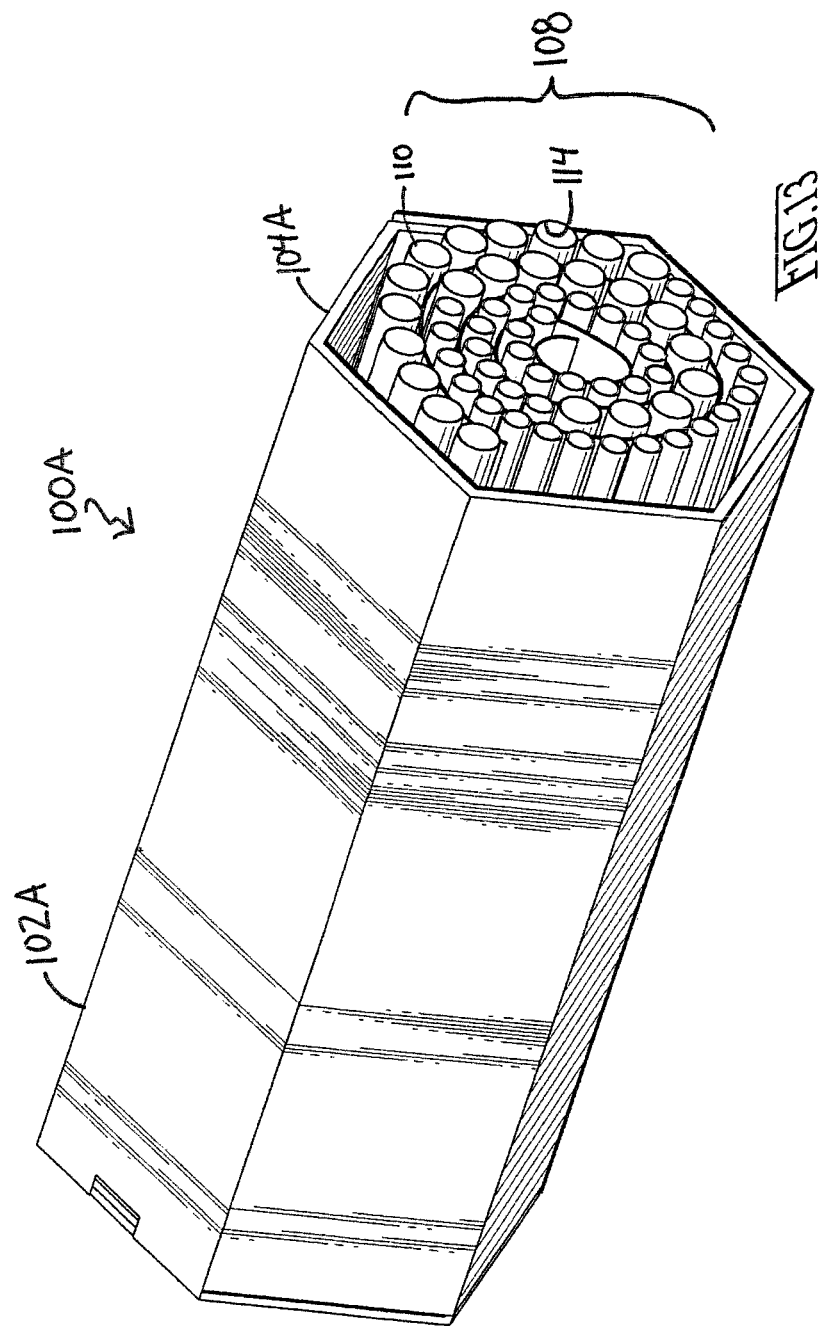
FIG. 13 is a perspective view of a single pollinator nursery habitat pod in accordance with the invention and previously shown in FIGS. 8-10.
Figure 14:
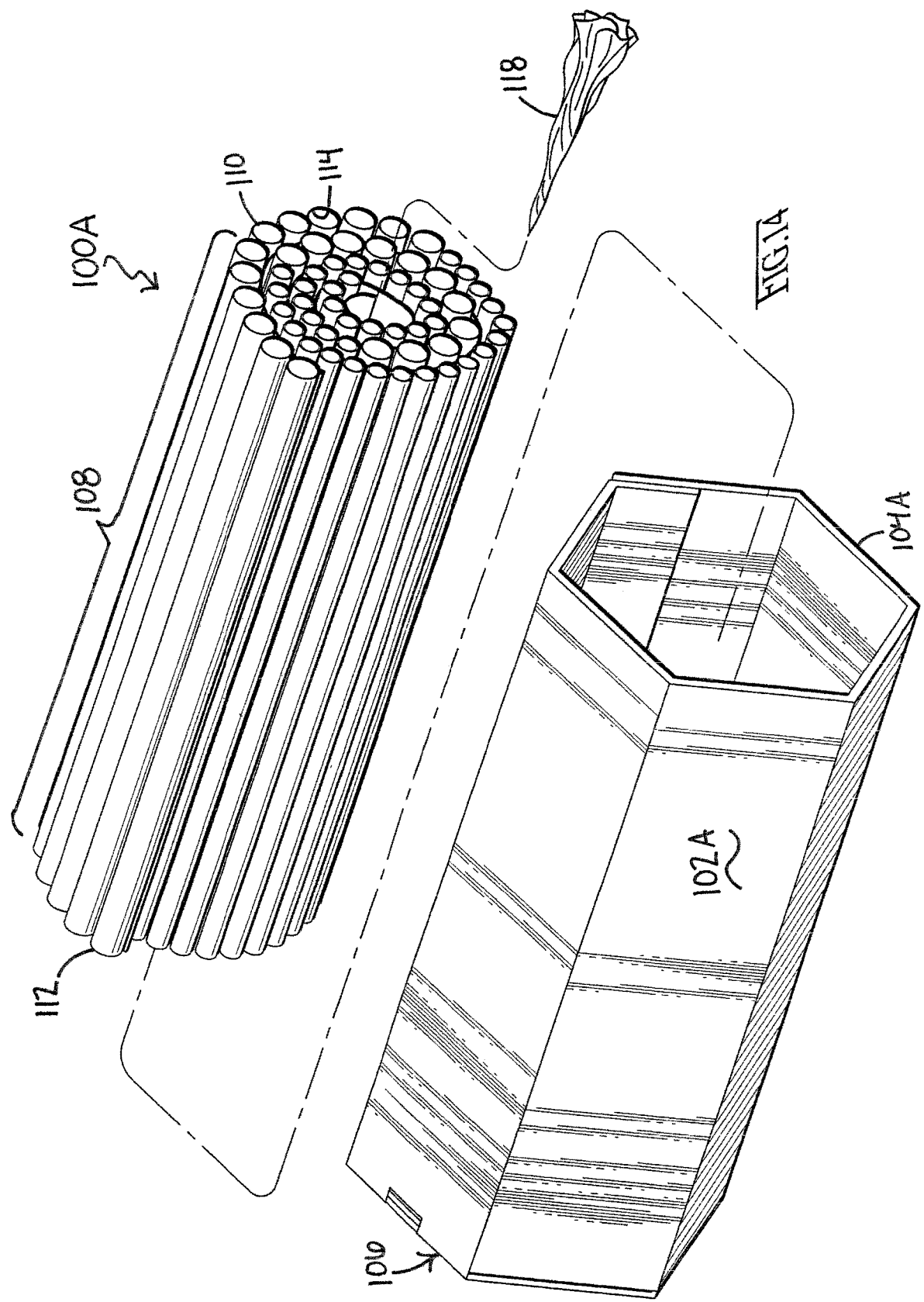
FIG. 14 is an exploded perspective view of FIG. 13 but further depicting an artificial flower serving as a floral attractant and/or navigation cue.

Although FIG. 12 shows how the rest of the structure 154 appears after it has been folded up. FIG. 12 also allows how to re-construct how the structure 154 is produced. A central 161 panel will serve as the floor 161. Two opposed panels 162 extending from the left and right edges of the floor will be the left and right sidewalls 162, respectively, of the structure 154. Two other opposed panels 163 and 164 extending from the front and back edges of the floor 161 will be the front and backs walls 163 and 164, respectively. Various overlap flaps accept fastening, preferably by mechanical thumb screws rather than adhesives, to hold the structure 154 together.

The sidewalls 162 and backwall 164 are solid. The front wall 163 is mostly open with a spacious opening 165. The opening 165 is bordered by a bottom sill 166 that is formed by a folded flap to give the bottom sill 166 a double wall thickness. When the roof 152 is attached, it too is fastened likewise by mechanical thumb screws. That way, users can undo the thumb screws and remove the roof 152 (or at least undo one half of it) to access the interior of the shelter 150 and insert and withdraw pollinator nursery habitat pods 100A at will. It is still intended that the pollinator nursery habitat pods 100A are used for one season—from one Spring to the following Spring, and then composted. Perhaps the shelter 150 can be re-used for several or more seasons. Still, it is preferred that the shelter 150 can be disposed of in a compost pile where it will compost away.

Figure 8:
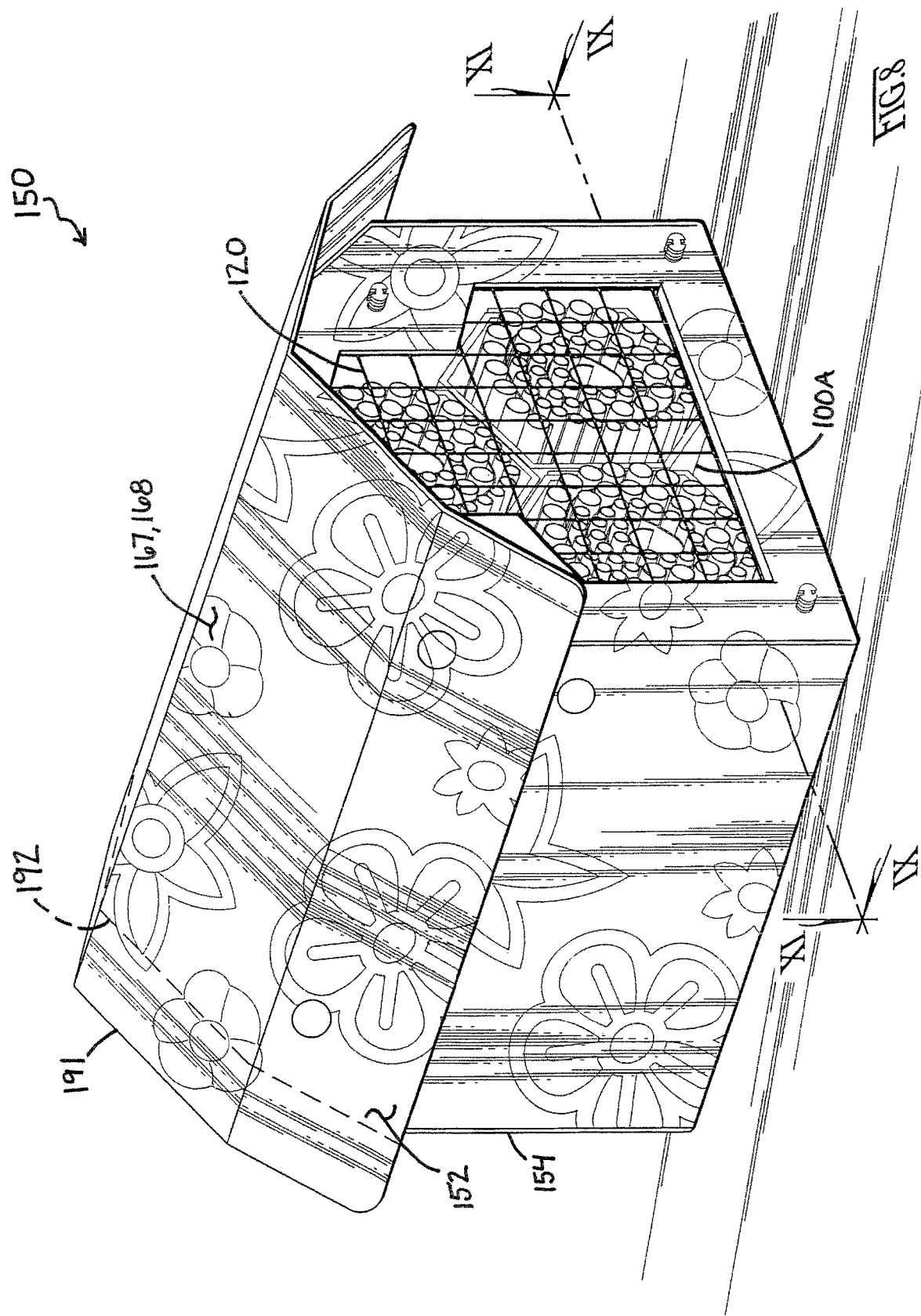
FIG. 8 is a perspective view of an alternate embodiment of a pollinator nursery habitat in accordance with the invention, in combination with a multi-unit shelter for a plurality of pods.
Figure 9:
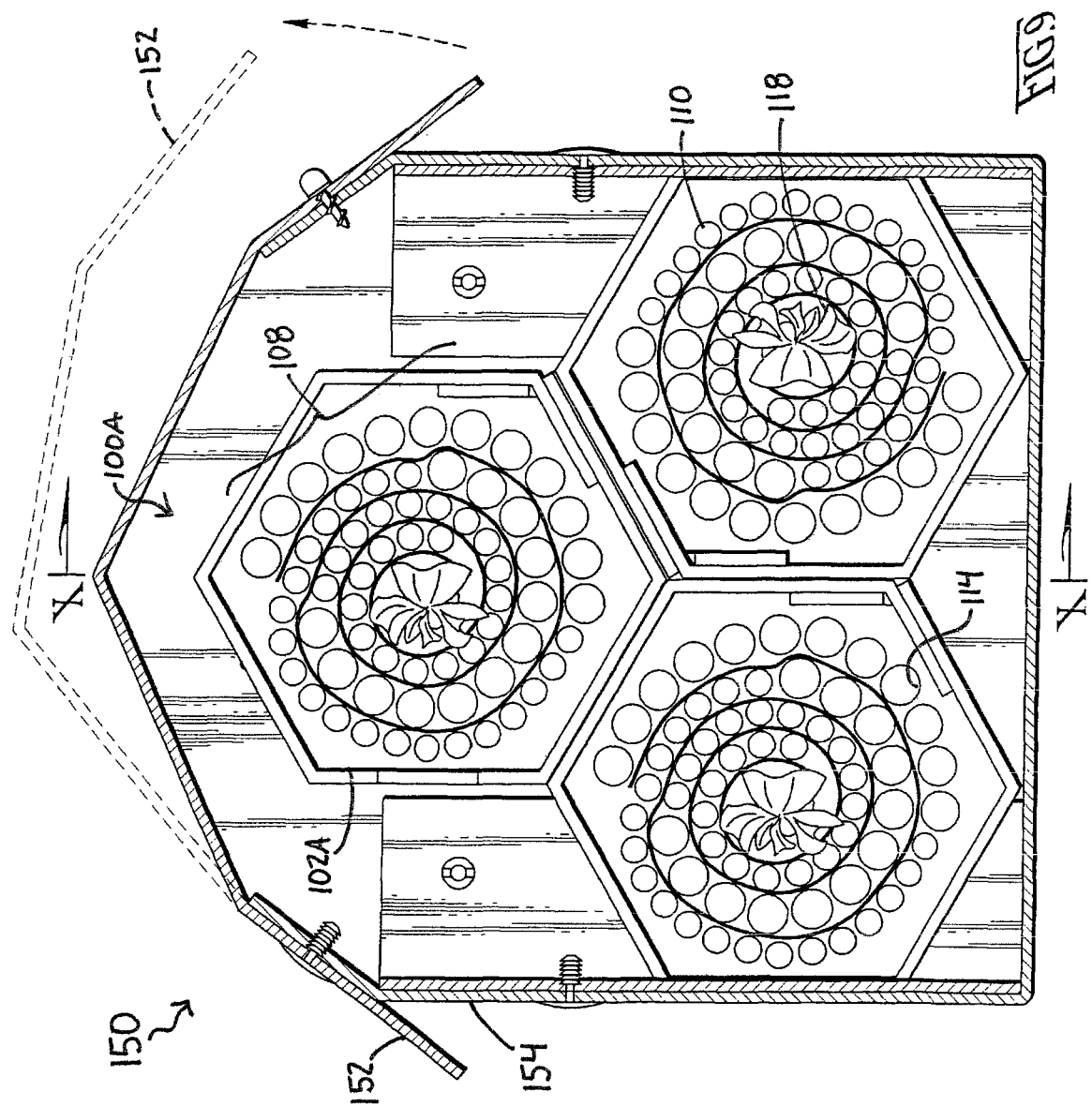
FIG. 9 is an end elevation view, partly in section, taken along line IX-IX in FIG. 8.
Figure 10:
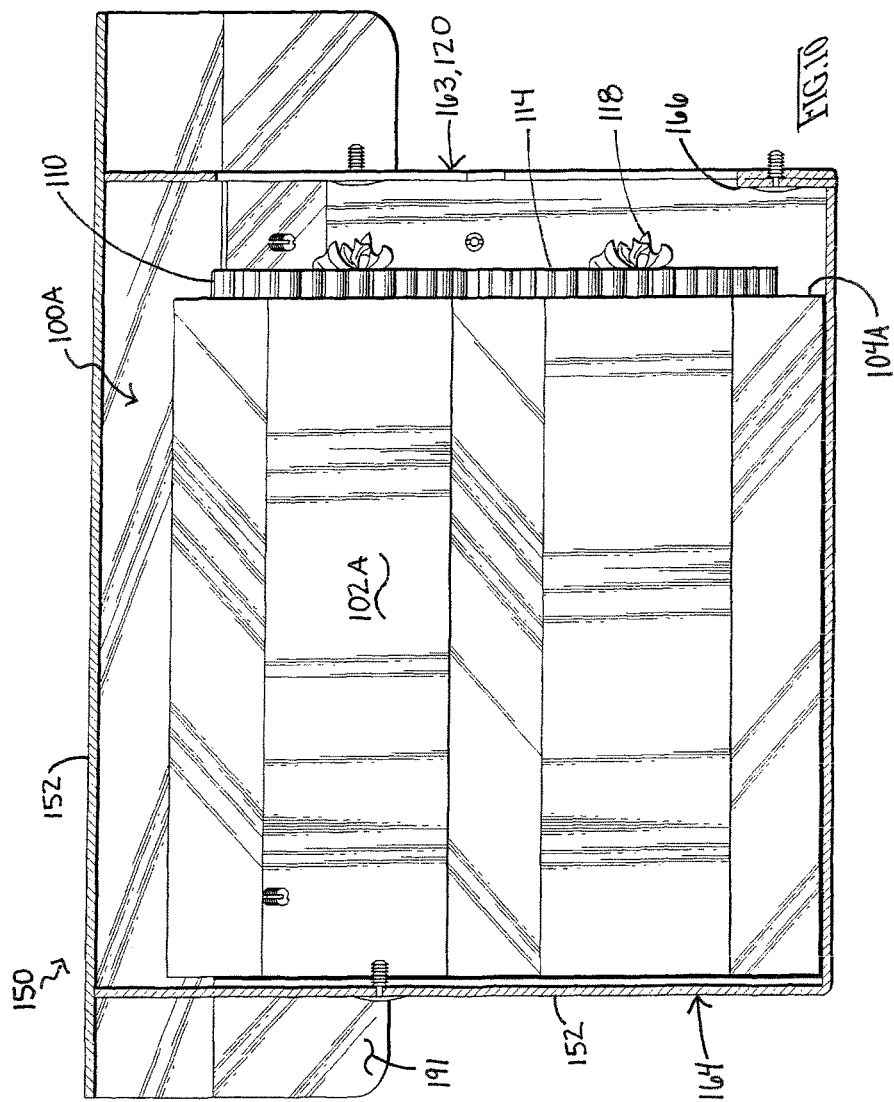
FIG. 10 is an axial elevation view, partly in section, taken along line X-X in FIG. 9.
Figure 11:
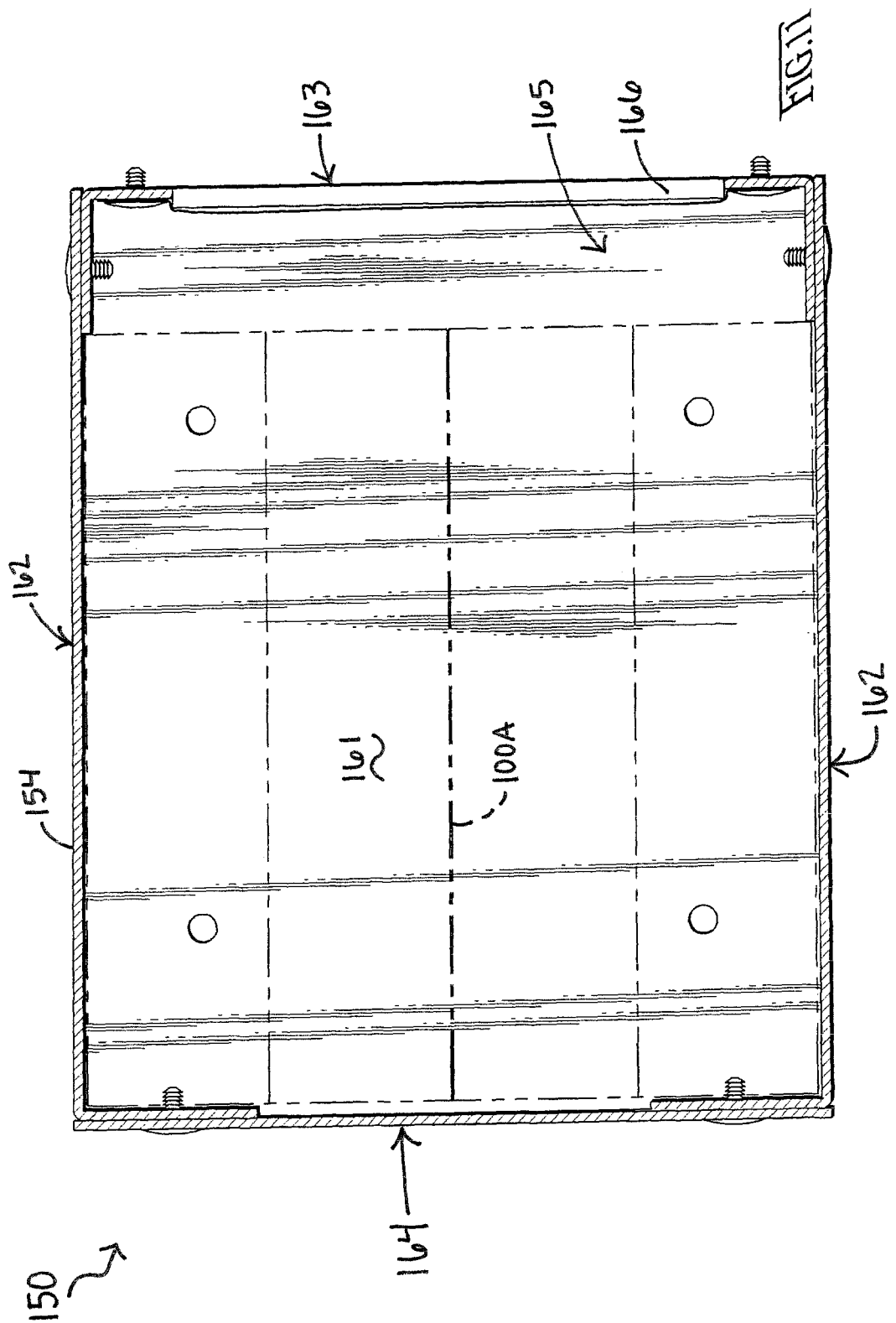
FIG. 11 is a plan view, partly in section, taken in the direction of arrows XI-XI in FIG. 8.

With the roof 152 attached, the shelter 150 forms an elongated enclosure extending between a closed backwall 164 and an open front wall 163 with spacious opening 165. FIGS. 8 and 9 show better that there are three pollinator nursery habitat pods 100A housed inside the shelter 150. FIG. 10 shows better that the open front ends 104A of the pollinator nursery habitat pods 100A are spaced behind the opening 165 of the front wall 163 of the shelter 150. Not only that, the open front ends 104A of the pollinator nursery habitat pods 100A are spaced behind the opening 165 of the front wall 163 by a considerable gap. Moreover, the opening 165 in the front of the shelter 150 is protected by a metal grill 120 (or plastic screen or the like). The gap between the grill 120 and open fronts ends 104A of the pollinator nursery habitat pods 100A should provide better protection against birds, perhaps putting the open front ends 104A from beyond reach outside of the grill 120.

FIG. 12 also shows the structure 154 before the walls 162-164 are coated with a floral attractant pattern 167, as well as being coated with an optional mineral coating 168 to improve weather resistance. Wax coatings or polymeric coatings are preferably avoided so as not to ruin the ability to be composted. A mineral oil coating 168 will provide some measure of rain shedding ability but again should not ruin the possibility of composting away in a compost pile.

FIG. 17 is a layout view of the case 102A flat, prior to folding and assembly, as produced from flat corrugated fiberboard stock material. FIG. 17 shows cut lines, slit lines, fold lines, as well as punched apertures (eg., rectangular cutouts here). This embodiment of a pod case 102A differs in that it folds up into a hexagonal cross-section and is not intended to do double duty as a shipping carton. Hence all flaps can be eliminated that temporarily would cover the open front end 104A.

Figure 16:
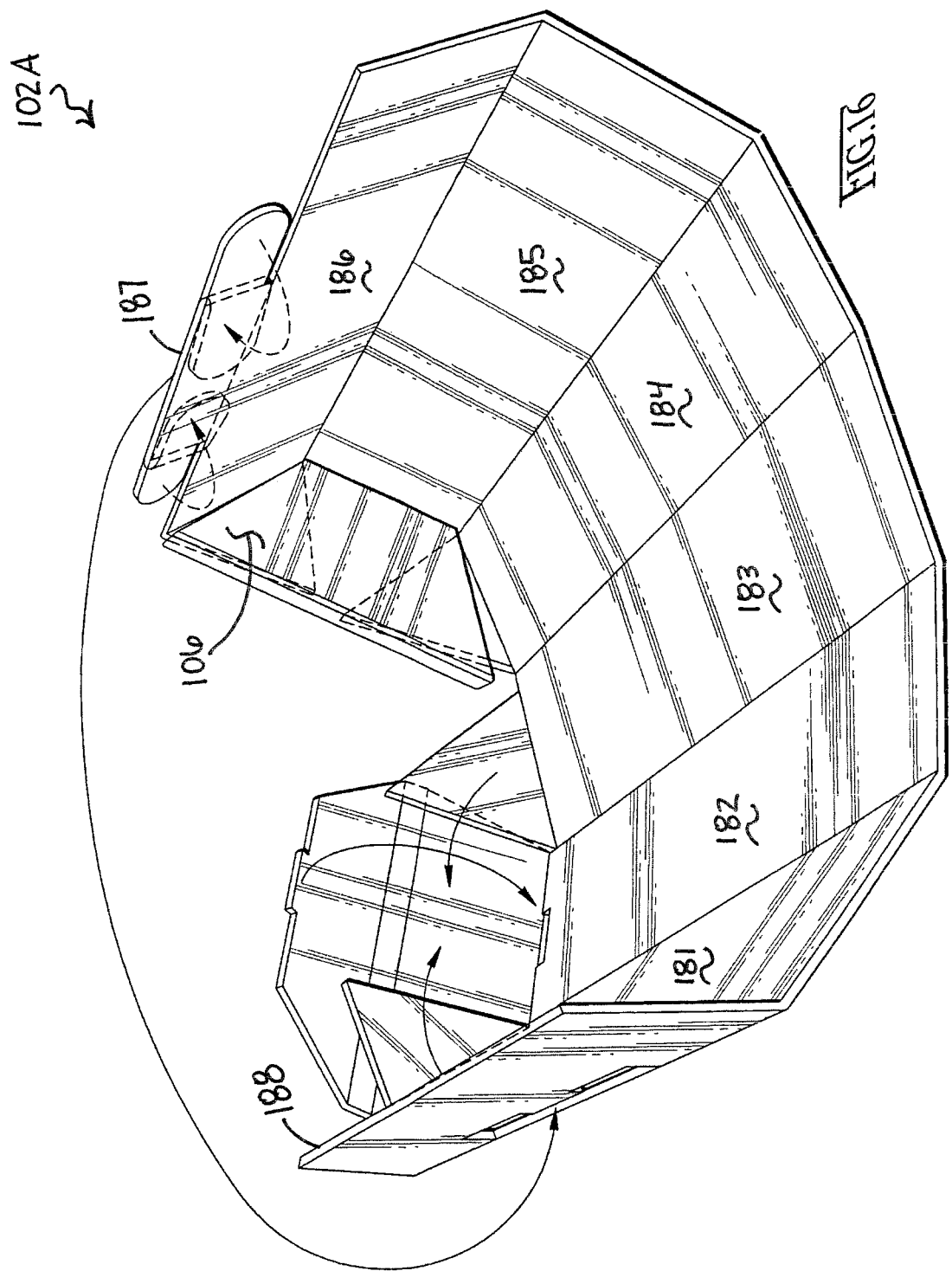
FIG. 16 is a perspective view showing the folding up and forming of the corrugated fiberboard pod case from corrugated fiberboard flat stock material.

The backwall 164 is formed out of the folding up of a pair of hexagonal flaps 171 optional triangular wedges 172, there being four triangular wedges 172 overall, two flanking each hexagonal flap 171. The hexagonal flaps 171 fold in half, and each flap 171 folds over both the flanking triangular wedges 172 that flank it, as shown in FIG. 16. Hence the backwall 164 is double ply everywhere, and triple ply in places. The folded in-half hexagonal flaps 171 are held in place a tab 173 and socket (eg., or slot) 174 latching system.

Figure 15:
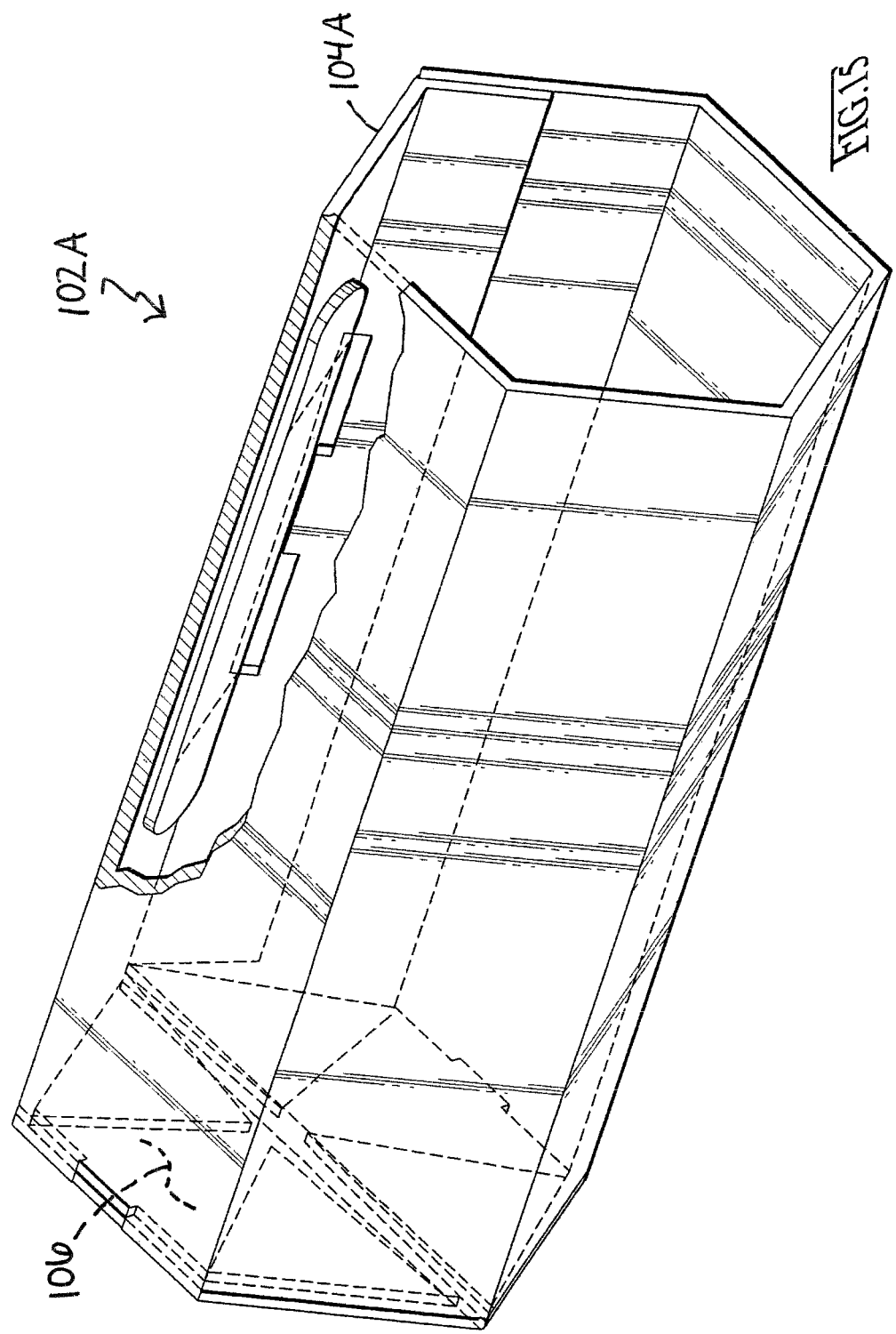
FIG. 15 is a perspective view comparable to FIG. 14 except showing the corrugated fiberboard pod case alone.

Correspondingly, the layout has a main span 181-186 partitioned into six inboard panels 181-186, which correspond to the six sidewalls 181-186 of the hexagonal case 102A, and two flanking flaps 187 and 188 outside of the six inboard panels 181-186 forming a tab 187 and socket 188 latching system wherein the tab 187 has wings 189 that expand beyond the edges of the socket 188 and thereby provide positive locking, as shown by FIG. 15.

These tab and socket 173-174 and 187-189 provisions allow the avoidance of adhesives or otherwise hard-to compost solid fasteners.

Figure 20:
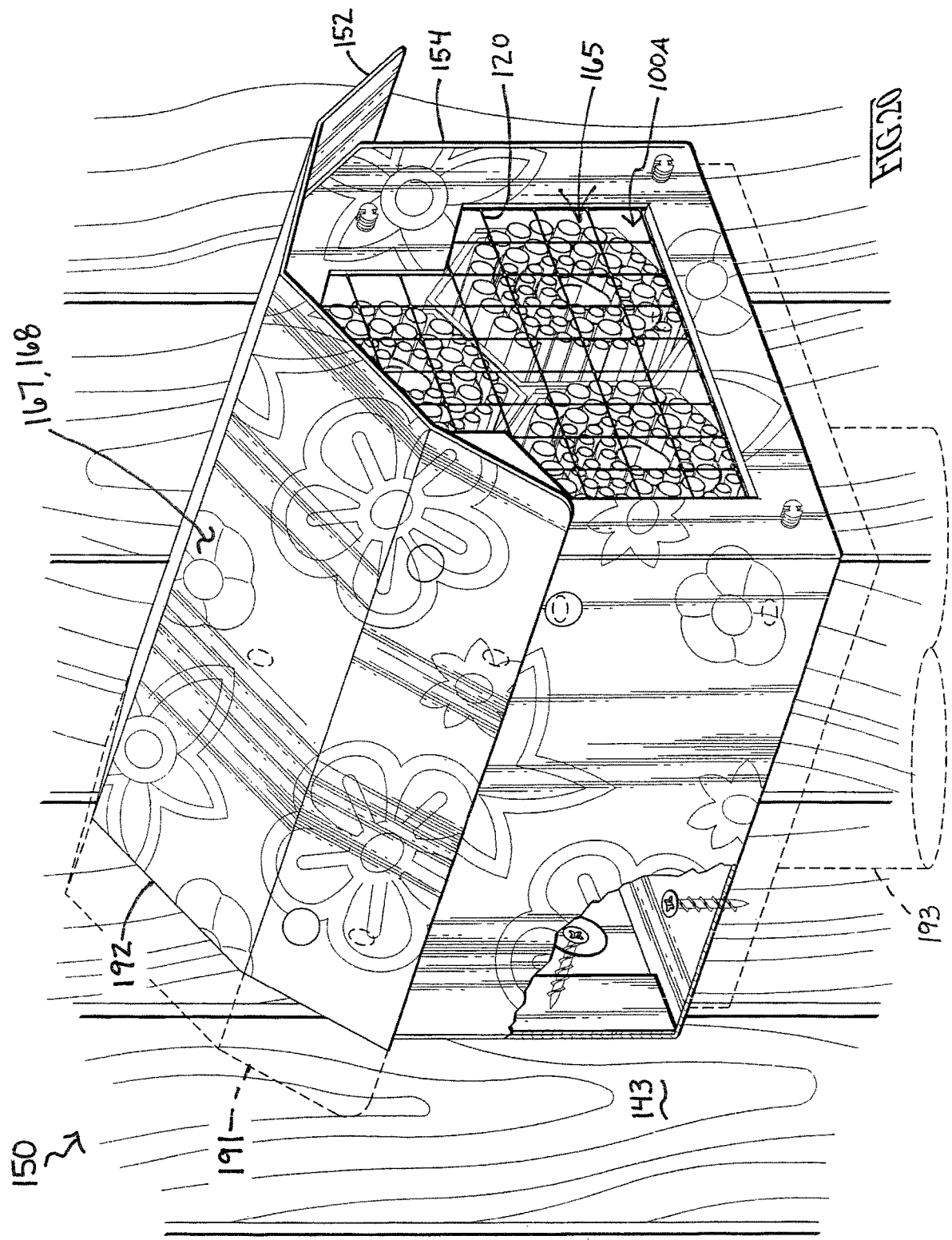
FIG. 20 is a perspective view comparable to FIG. 8 except showing—in solid lines—the pollinator nursery habitat mounted to a wall (eg., any suitable vertical support surface) or alternatively—as shown in dashed lines—the pollinator nursery habitat being propped up on a pole.

FIG. 20 shows two ways of mounting the inventive multi-unit shelter 150 of FIG. 8. In solid lines, the shelter 150 is the mounted to a wall 143 (eg., any suitable vertical support surface). The rear eave 191 of the roof 152 has a scored perforation line 192, along it so that the rear eave 191 can be removed to allow flush mounting of the shelter 150 against the wall 143.

As shown in dashed lines, the shelter 150 in accordance with the invention can be perched upon (propped upon) a pole 193.

FIG. 21 is lined for color and shows that the floral attractant patterns 167 gracing the pollinator nursery habitats 100 and/or multi-unit shelters 150 of FIGS. 1, 8 and 20 are chosen not only for simulating the outline of blooming flowers but also colored (eg., purple-violet for the flower on the left, blue for the flower on the right) to further enhance the attractant qualities of and/or navigation-cues offered by the patterns.

Pause can be taken to reflect on a number of advantages brought about by and/or manners of uses of the invention.

It is beneficial that the pollinator nursery habitat pods 100,100A are used for one season, or just one generation of pollinators that produce a couple or more generations a summer, and then dispensed with. That way, parasites that may infest these sites are likewise dispensed with. A fresh pod is supplied, free of the parasites. And by these means and practices, these sites don't become perpetual breeding colonies for parasites.

The pollinator nursery habitats 100,100A in accordance with the invention are economical to make the cost of replacement low, and are inexpensive to ship because of low weight. Some embodiments have a case 102 that double duties as a shipping container and full 360° tubular sidewall.

It is an aspect of the invention to create exterior ornamental designs that do not use paints or inks that are dangerous to the environment or bees or humans or all three. It is another aspect of the invention to use exterior ornamental designs that are attractive to the pollinators, and in colors attractive to the pollinators, irrespective of human appeal or not.

Moreover, further aspects with the involve providing rain/weather protection to the front of the pollinator nursery habitats 100,100A in accordance with the invention, as well as some measures of predator deterrence (eg., bird predation) or other threats (eg., squirrel damage).

The pollinator nursery habitats 100,100A in accordance with the invention are designed to be recycled each year in the spring after the bees have emerged from their pupae stage and emerge to continue a new cycle of feeding and egg laying. The pollinator nursery habitats 100,100A in accordance with the invention are made of easy-to-recycle or compostable paper products with only a minimal amount of metal (also recyclable).

The pollinator nursery habitats 100,100A in accordance with the invention are printed with water soluble, environmentally friendly inks that use colors from the blue fringe of the visible and near ultra-violet electromagnetic spectrum. These colors are believed to be especially appealing to pollinators:—eg., purple-violet, blue, pink and so on.

The multi-unit (eg., shelter 150) version of the pollinator nursery habitats 100,100A in accordance with the invention includes a wire screen that covers the open front ends 114 of the paper tubes 110 with a setback space that discourages nuisances like squirrels and birds.

Certain versions of the cases (eg., 102) are preferably made of a mineral coated paper that resists water, mold and deterioration in adverse weather conditions.

Correspondingly, certain versions of the cases 102,102A are preferably include built-in features for mounting or hanging, like mounting flanges provided with pre-formed screw holes. It is preferred during the Spring and/or early Summer season, the pollinator nursery habitats 100,100A in accordance with the invention are mounted solidly to resist swaying in the wind. That way, the integrity of the nests in the tubes 110 are not compromised. However, over winter, the pollinator nursery habitats 100,100A in accordance with the invention can be hung in a cool shed as there is little risk of wind inside. It has to be cool to cold, or too much warmth will cause premature emergence of adults.

The pollinator nursery habitats 100,100A in accordance with the invention may include venting so that the insects in the cartridges stay cooler during hot months. These vents may be open during the summer and may be closed in the winter if the insects are expected to overwinter in place.

The pollinator nursery habitats 100,100A in accordance with the invention may include monitoring equipment (not shown) and the means of transmitting data for the purpose of monitoring conditions inside the housing including but not limited to temperature and humidity. Moreover, the pollinator nursery habitats 100,100A in accordance with the invention (or sub-components thereof) may include RFID or other electronic devices (not shown) to keep track of the cases 102,102A and the insects inside.

The pollinator nursery habitats 100,100A in accordance with the invention (or sub-components thereof) may include bar codes or other types of markings (not shown) that can be scanned and used to record and track the progress of the pollinators, or even pull down online information comprising use instructions, likely according to a calendar particular for a use locale, micro-climate, target vegetation (eg., vegetable garden vs. native prairie) and so on.

In use, in the Fall, the user removes the pollinator nursery habitat pods 100,100A and stores the pollinator nursery habitat pods 100,100A in a cool, dry place until Spring, when the pollinator nursery habitat pods 100,100A are removed from storage and re-distributed to new places. Placing the pollinator nursery habitat pods 100,100A in a sunny spot should cause the young insects to emerge and begin a new cycle.

After the adults emerge, the user should replace the used pollinator nursery habitat pods 100,100A with fresh new ones as soon as practicable. Again, disposing the used pollinator nursery habitat pods 100,100A annually and not re-using them prevents the used pollinator nursery habitat pods 100,100A from becoming parasite hotels.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A nursery habitat for flying pollinators, comprising:
an axially-elongated tubular case extending between a first end and a second end and defining an axially-elongated hollow tunnel, wherein at least one of the first end or the second end is provided with an opening; and
a core comprising an elongated web of fiber board stock material formed into a spiral coil and a multiplicity of elongated tubes, each of the tubes comprising a single cylindrical tube of paper or pulp-based material and extending between a front end and a back end, wherein at least the front end is open;
said web and multiplicity of elongated tubes being adjoined together to form the core as an independent unit independent of the case, and with the tubes aligned on the web side-by-side in closely-spaced packing to form a cylindrical coil unit;

said core being formed and configured for insertion inside the tunnel of the case through the opening of the case with the open front ends of the tubes being accessible to flying pollinators through the opening in the case; and said core being unattached to the case and being adjoined together such that the core is capable of withdrawal from the case concurrently with being capable of holding the adjoined together form in closely-spaced packing.

2. The nursery habitat for flying pollinators of claim 1, wherein:

the web further comprises single-sided liner board corrugated fiber board; and the tubes are adhered to the liner board side.

3. The nursery habitat for flying pollinators of claim 1, wherein:

the multiplicity of tubes comprises at least a first set and a second set wherein:

the first set comprises a multiplicity of tubes characterized by a first nominal diameter; and the second set comprises a multiplicity of tubes characterized by a second nominal diameter greater than the first nominal diameter.

4. The nursery habitat for flying pollinators of claim 3, wherein:

the first nominal diameter is six, eight, ten or twelve millimeters; and the second nominal diameter is six, eight, ten or twelve millimeters but not the same as the first nominal diameter.

5. The nursery habitat for flying pollinators of claim 1, wherein:

the case comprises an elongated box construction of corrugated fiber board stock material with a square or rectangular cross-section profile having four sides or two of the longest sides respectively being 10 cm or less;

the case further comprises one or more permanent flaps or permanent flap portions to render one of the first end and the second end as a closed back end; and the case further comprises one or more temporary flaps or temporary flap portions which are configured to render the other of the first end and the second end as a temporarily closed front end, whereby the case serves double duty as a mailing container through the U.S. Mail and later, after mailing, the temporary flaps or temporary flap portions are removed to open the opening.

6. The nursery habitat for flying pollinators of claim 5, wherein:

the front end of the case when rendered open is fully open;

the closed back end of the case is fully closed;

the multiplicity of tubes are open at both ends but are disposed in the axially-elongated tunnel of the case such that the back ends of the tubes back up to the closed back end of the case, whereby the back ends of the tubes are essentially closed to through access by flying pollinators and flying predators; and the permanent flaps or permanent flap portions for the front end are configured for serving as a rain-shedding eave projecting out over the opening of the case.

\* \* \* \* \*